United States Patent [19]
Snyder

[11] 3,877,901
[45] Apr. 15, 1975

[54] BAG FILTERS
[75] Inventor: Clyde A. Snyder, Mishawaka, Ind.
[73] Assignee: Wheelabrator-Frye Inc., New York, N.Y.
[22] Filed: May 29, 1973
[21] Appl. No.: 364,375

[52] U.S. Cl. .................................... 55/304; 55/378
[51] Int. Cl. ........................................... B01d 46/04
[58] Field of Search ............. 55/304, 305, 378, 379

[56] References Cited
UNITED STATES PATENTS

| | | | |
|---|---|---|---|
| 2,122,799 | 7/1938 | Leathers | 55/305 X |
| 2,768,706 | 10/1956 | Fischer | 55/304 X |
| 2,781,104 | 2/1957 | Fischer | 55/304 X |
| 3,636,680 | 1/1972 | Seidel | 55/304 X |

Primary Examiner—Frank W. Lutter
Assistant Examiner—William Cuchlinski, Jr.

[57] ABSTRACT

A filter apparatus which makes use of one or more filter bags suspended within a filter housing and shaking mechanism for shaking the bags during discontinuance for filter flow to effect displacement of filter solids collected on the ingoing side of the filter bag in which in addition to the tube hook suspending the filter bags, at their upper ends to the shaking mechanism, boot straps are provided interconnecting the shaking mechanism with intermediate portions of the filter bags for increasing the magnitude and force of the treating operation.

6 Claims, 10 Drawing Figures

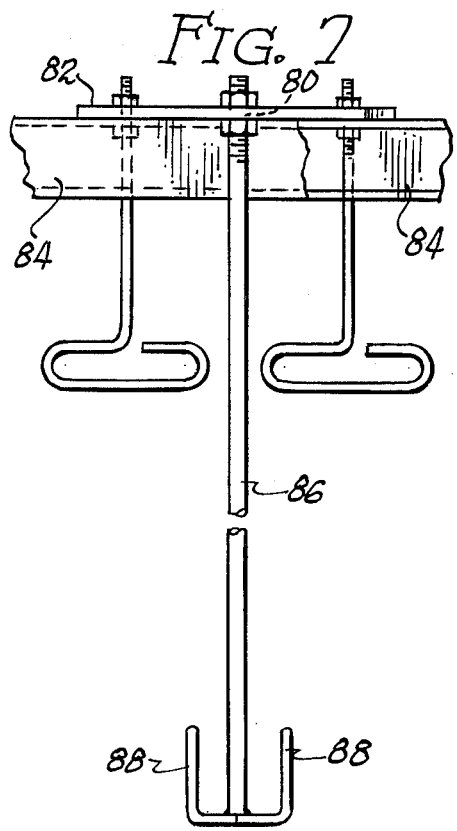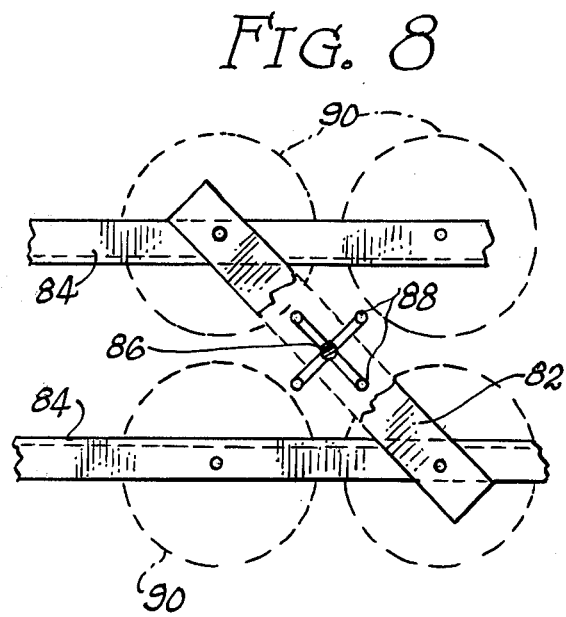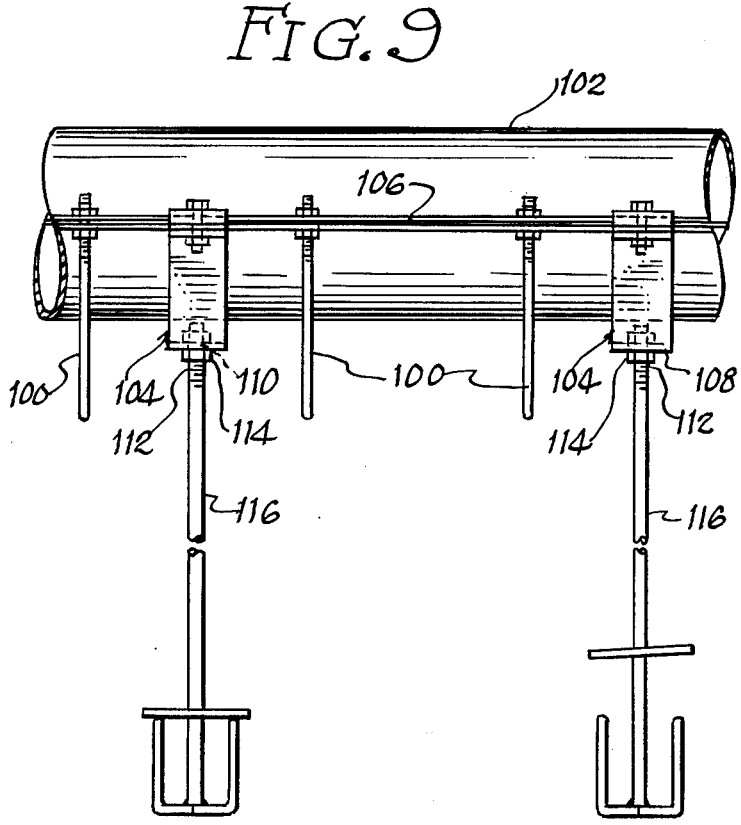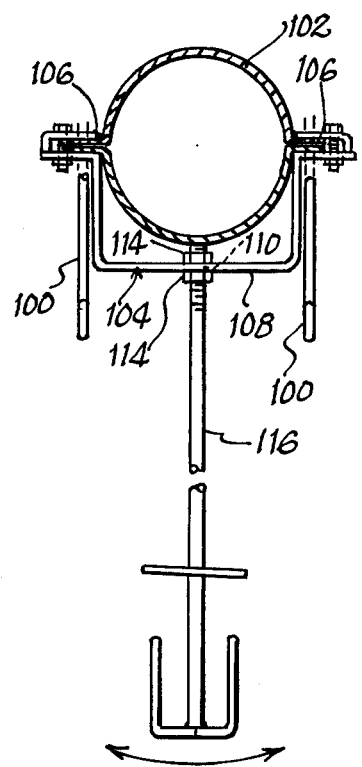

BAG FILTERS

This invention relates to a filter device which makes use of filter bags in the form of elongate tubular members of filter fabric for separation of solid particles on the ingoing side of the filter fabric as the filtered air or gas passes therethrough. It relates more particularly to the means for mounting the filter bags with mechanism for shaking the bags to effect removal of filter cake and separated solids collected on the ingoing side of the filter surface.

In U.S. Pat. No. 2,143,644, and U.S. Pat. No. 2,879,863, which are incorporated herein by reference, description is made of a typical filter device in which this invention may be incorporated, wherein a plurality of elongate tubular members of a filter fabric are suspended from their upper ends on hanger rods while their lower ends are secured to a plate with extends across the interior of the filter compartment.

In this arrangement, corresponding to the construction illustrated in the aforementioned patents, the upper ends of each of the filter tubes is closed with a loop or strap for suspension onto the hanger rod while the lower end is open for connection to a collar surrounding an opening through the plate. In this arrangement, the dirt laden air or other gaseous medium flows from the inlet plenum chamber, through the opening, into the interior of the filter tube for separation of the solids on the interior walls of the tube as the clean gas or air filters therethrough.

As the separated solids build up on the ingoing side of the filter surface, the pressure drop or resistance to gaseous flow through the filter area increases. As a result, in the operation of a filter device of the type described, it is incumbent, at regular intervals, to effect removal of a portion of the built up solids in order to prevent the pressure drop or resistance to filter flow from becoming excessive. A high pressure drop results in considerable reduction in gaseous flow through the filter and renders the process wholly inefficient.

For this purpose, it is conventional practice to suspend the individual filter bags from a tube hook or other means of suspension coupled, usually with several other like members, to a mechanism which is capable of shaking the tubular member at the upper end, with a back and forth motion, swinging or arcuate motions, such as illustrated in the aforementioned patents.

In order effectively to remove the collected solids built up as a filter cake on the ingoing side of the filter surface, it is desirable to transfer the described shaking motion or force throughout the length of the filter bag. However, where the bag is of considerable length, such as in conventional bags of 30 or more feet in length, with the lower end fixed to a cell plate or nipple, this is difficult to achieve by a shaking action applied only at the upper end. With an elongate bag formed of a flexible fabric, it is possible to achieve a straining effect by pulling but a similar effect cannot be transmitted by pushing.

The desired result can conceivably be achieved, at least in part, by interconnection of the shaking mechanism with spaced portions of the individual filter bags in addition to the support at the upper end, and it is an object of this invention to provide a method and means for accomplishing same by slight modification of units currently in operation as well as units of new design.

It is also well known that speed, stroke, span and excursion of the bag support member, during the shaking operation, have material effect on the bag cleaning process. Increase in stroke or excursion bears a linear relationship to the bag cleaning operation. For example, doubling of the stroke operates to almost double the cleaning force, other things remaining equal. However, a worthwhile increase in the hook end portion of the hanger rod from say ⅞ inch to 2¾ inches for a 3.15-fold increase in excursion, would require extensive changes in the construction and operation of the shaker mechanism. Thus, it is a further object of this invention to provide a method and means for increasing the effective stroke or excursion of portions engaging the filter bag to enhance the cleaning force and in which such method and means can be adapted to present construction as well as to new designs of shaker mechanisms.

Inertia also plays an important part in the bag cleaning operation whereby the filter cake and separated dirt or dust particles depart from the filter fabric as it is whipped back and forth during normal oscillating movements in the bag shaking operation. For this purpose, in present practice, the shaking mechanism is adapted to impart a substantially linear back and forth motion, when viewed from above. Twisting of the bag on its vertical axis, in addition to the whipping action imparted during the shaking operation, should operate more effectively to loosen the filter cake and collected dirt particles whereby more efficient and more effective bag cleaning can be achieved, and it is another object of this invention to embody such features in current and future shaker designs.

In a typical installation of the type described in the aforementioned patents, use is made of filter bags of 5 inches in diameter, mounted on 6 inch centers, so as to provide for a spacing of 1 inch betwen bags when inflated during normal filter flow. The bags tend to deflate when filter flow is shut off for the bag cleaning operation whereby the width of the bag may increase to as much as 8 inches with the result that wear due to abrasion increases upon contact of one bag with another during the cleaning process. Thus it is another object of this invention to provide a filter bag assembly wherein edge clearance is maintained between bags in the deflated condition, thereby to increase the useful life of the filter bags and decrease the frequency of shutdown to effect replacement of bags that have become worn.

These and other objects and advantages of this invention will hereinafter appear and for purposes of illustration, but not of limitation, embodiments of the invention are shown in the accompanying drawings, in which FIG. 1 is a side elevational view of a portion of the bag filter device which shows the shaker mechanism embodying the features of this invention;

FIG. 7 is a side elevational view of a still further modification in a shaker mechanism and filter bag support embodying the features of this invention.

FIG. 8 is a top plan view showing the arrangement of elements in the shaker mechanism of FIG. 7;

FIG. 9 is a side elevational view of another modification in a shaker mechanism and filter bag support, embodying the features of this invention; and FIG. 10 is a top end view showing the arrangement of elements in the shaker mechanism shown in FIG. 9.

Figure 1:
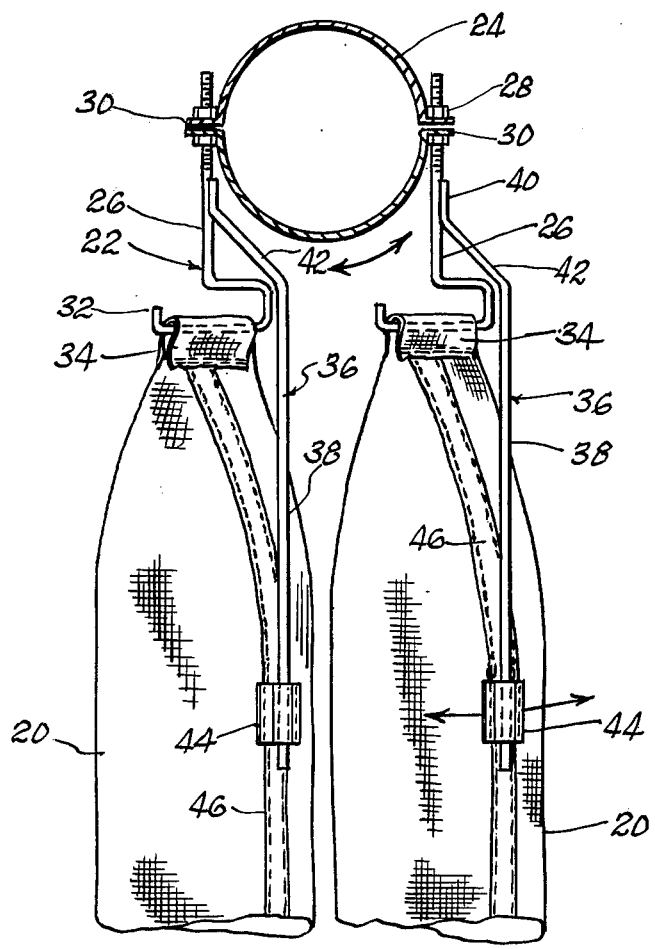
Figure 2:
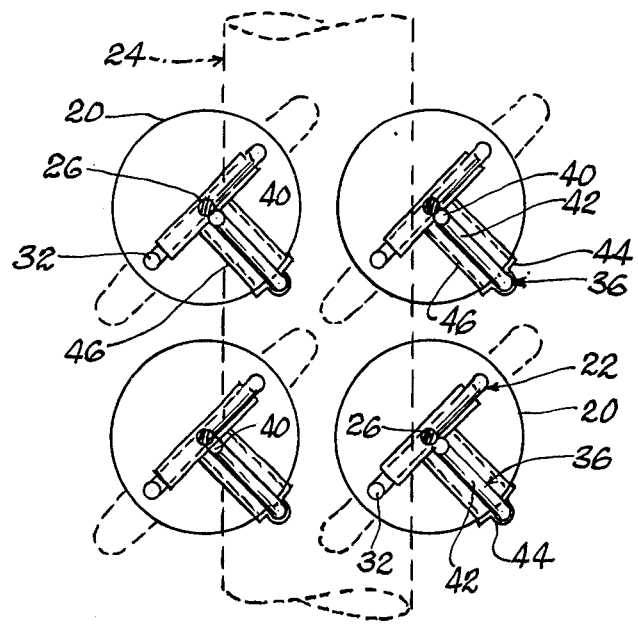
FIG. 2 is a top plan view of the device shown in FIG. 1.

With reference now to FIGS. 1 and 2 of the drawings, illustration is made of one form of bag support and an associated portion of the shaker mechanism embodying the features of this invention. The filter bags 20 are in the form of elongate tubular members formed of a filter fabric. Ordinarily a number of bags make up a single filter section within a filter compartment, although only four such filter bags are shown in FIGS. 1 and 2 of the drawings.

The filter bags 20 are closed at their upper ends and means are provided for supporting the bags, at their upper ends, from two hookds 22, connected to form a part of the shaker mechanism. In the illustrated modification, the two hooks 22 are secured at their upper ends to diametrically opposed sides of a shaker tube 24 which extends horizontally through the length of the filter tube section and is mounted for reciprocal rotational movement about its horizontal axis through an angle which may be in the range of 5°-30°.

The two hooks 22 are formed with elongate hanger rods 26, which are threaded at their upper ends for attachment, as by means of nut members 28, on opposite sides of ears or flanges 30 extending laterally from the opposite sides of the shaker tube 24, to enable vertical adjustment of the hanger rods relative to their attachment to the shaker tube.

The lower end portion of each of the hanger rods 26 is formed with a hook member 32 that extends horizontally through a loop 34 on the closed end of the filter bag, removably to support the bag from the tube hook.

The described arrangement represents current conventional construction. With rods having an effective length of 5 inches from the axis of the shaker tube to the hook 32 on the end of the hanger rod, reciprocal rotational movement of the shaker tube about its axis through an angle of about 20° will cause the end of the tube hook to rock back and forth through an arc of about ⅞ inch. This will cause the filter tube to whip back and forth with a concurrent slight up and down or pull and push motion on the filter bag.

In accordance with the practice of this invention, the tube hook is provided with an extension 36, in the form of an elongate rod 38, having a length of 40 at the upper end rigidly secured, as by welding, to an intermediate vertically extending portion of the hanger rod 26. The extension rod, hereinafter referred to as a boot strap rod, is provided with an offset portion 42, adjacent its upper end, to clear the filter bag and then extends downwardly beyond the upper end of the filter bag for a distance to engage the filter bag at one or more points remote from its upper end. In the illustrated modification, the boot strap rod extends alongside the filter bag for an additional 15 inches and is attached to the adjacent portion of the bag by means of a stirrup 44 or sleeve, which either encases the bag or is attached thereto, as along the bag seam 46. It will be understood that the boot strap rod can continue to extend for an additional distance alongside the filter bag, up to almost the full length thereof, with periodic attachment to connect the filter bag with the adjacent portion of the boot strap rod.

In the illustrated modification, wherein connection between the filter bag and the boot strap rod occurs some 15 inches below the upper end of the bag, the to and fro motion at the point of connection will be about 2¾ inches compared to the ½ inch movement of the hook member from which the upper end of the bag is suspended. This is a magnification of more than threefold in the excursion of the bag at this point, thereby to achieve more substantial movement of the bag, at a higher rate, with corresponding increase in cleaning force for more effective removal of filter cake or collected solids. Thus shaking frequency, from top to botom of the bag, is more than doubled without any change in shaker speed.

In order to minimize wearing abrasion responsive to engagement between the edges of adjacent filter bags, when filter flow is cut off, and the bags are collapsed during shaking to clean the bags, the hooks 32, from which the upper ends of the bags are suspended, are offset at an angle of 40°-50° (preferably about 45°) from the crosswise and lengthwise aligned centers of the bags. As a result, flattening in the collapsed condition will occur along the diagonal where the distance between centers corresponds to the hypotenuse of about 8½ inches along the right angle triangle having 6 inch sides, corresponding to 5 inch bags arranged on 6 inch centers, so that the bags will not touch each other in their flattened. condition, as illustrated in FIG. 2.

The described combination provides a considerable reduction in pressure drop or resistance to air flow. For example, in the construction described as representative of the practice of this invention, a reduction in pressure drop with no change throughput of 22-42 percent is achieved, depending somewhat upon the type of strap or cap at the top, or a 35-45 percent increase in throughput at constant loading with the original pressure drop. In practical terms, this means that the capacity rate for a conventional fabric filter can be increased considerably with but slight modification of the shaker mechanism and bag support or that pressure drop can be reduced while the capacity remains the same.

These same concepts are capable of being achieved with other arrangements of the hanger rods and boot strap rods in the shaker mechanism.

Figure 3:
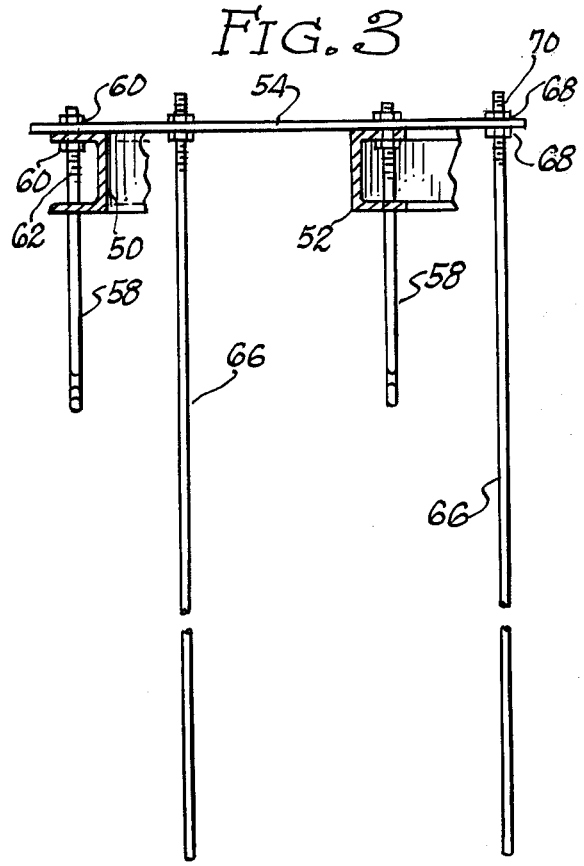
FIG. 3 is a side elevational view of a modification in the shaker mechanism and filter bag support, embodying the features of this invention.
Figure 4:
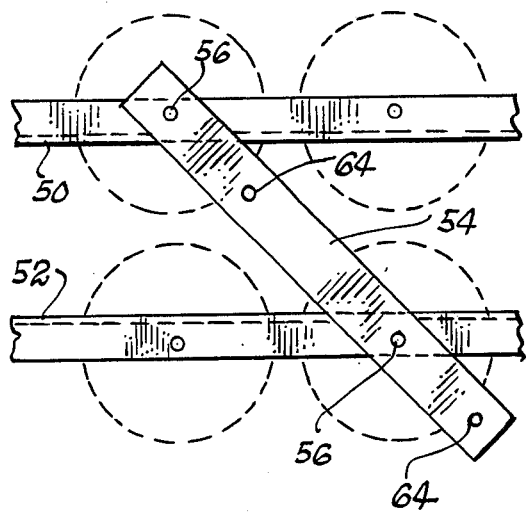
FIG. 4 is a top plan view showing the arrangement of parts for the shaker mechanism of FIG. 3.

In the modification illustrated in FIGS. 3 and 4, the shaking action is provided by a pair of laterally spaced apart, horizontally disposed shaker channels 50 and 52, mounted for reciprocating movement through relatively short strokes in directions opposite from one another. Such movements are imparted by conventional actuating means not shown. For 5 inch bags on 6 inch centers, the shaker channels are arranged in parallel relation with a spacing of about 6 inches between centers.

A cross bar 54 extends horizontally crosswise between the shaker channels 50 and 52 at an angle to the shaker channels, preferably within the range of 30°-60°, and more preferably at an angle of about 45°. The cross bar 54 is pivotally connected to each of the shaker channels at their cross-over points 56.

The tube hooks 58, of the type previously described, are suspended from the shaker channels 50 and 52 at the pivot points 56. For this purpose, the shaker channels and the crosswise bars are provided with aligned openings at the pivot points for receiving the upper end portion of the tube hook rod, and means are provided for vertical adjustment for length, as by the use of anchoring nuts 60 which threadably engage the threaded end portion 62 of the tube hook rods 58 for securing the tube hooks in their adjusted position to the shaker channels.

Additional boot strap rod openings 64 are provided in the crossbar 56, offset by the same amount in one direction from the pivotal connection 56 to the shaker channels 50 and 52. The upper end portions of the boot strap rods 66 extend through said openings and are secured thereto, as by means of anchoring bolts 68, which engage the through-extending threaded end portion 70 of the boot strap rod for attachment to the cross bar suitable vertical adjustment. The boot strap rod extends downwardly alongside the filter bag suspended from the hanger rod to the desired point or points for attachment to the filter bag or saddle, as previously described.

In the modification illustrated, wherein use is made of 5 inch bags on 6 inch centers, the shaker channels 50 and 52 are spaced 6 inches apart, as previously described. The pivotal connection between the cross bars and the shaker channels 50 and 52 are spaced 6 inches in the lengthwise direction whereby the length of the cross bar 54 between pivot points will be about 8½ inches, corresponding to the length of the hypotenuse between the 6 inch sides of a right triangle. The adjacent cross bars will be parallel one with another, with a 6 inch spacing therebetween in the lengthwise direction of the shaker channels.

It will be seen that, in this modification, in addition to the movements obtained in the previous modification, as one shaker channel moves relative to the other in the lengthwise direction, the point from which the boot strap rods are suspended will be caused to swing about the pivot point on the shaker channel. This will operate to impart a rotating or spinning motion which is directly transmitted in an accentuated fashion to the intermediate portion of the filter bag operatively connected to the lower end portion of the boot strap rod whereby the entire bag is twisted and shaken more vigorously.

Figure 5:
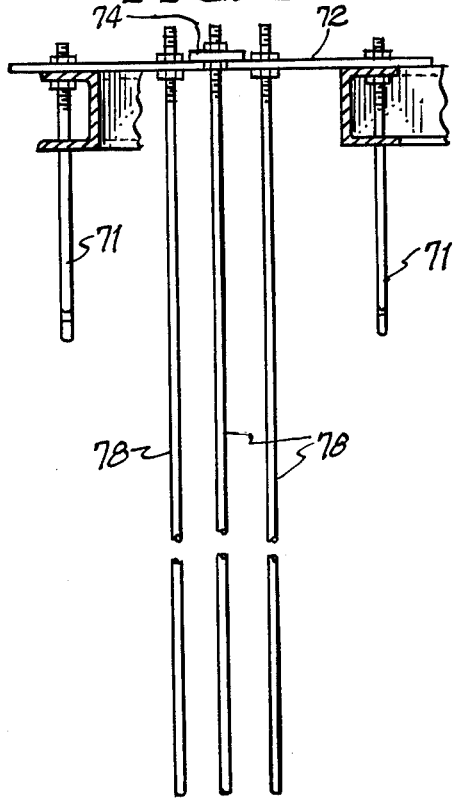
FIG. 5 is a side elevational view of a further modification in the shaker mechanism and support, embodying the features of this invention.
Figure 6:
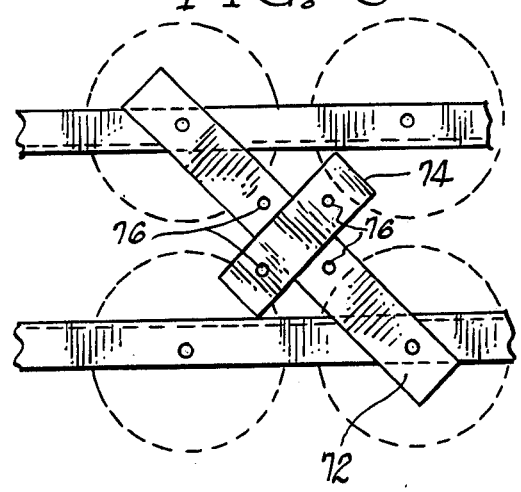
FIG. 6 is a top plan view showing the arrangement of parts for the shaker mechanism of FIG. 5.

The modification shown in FIGS. 5 and 6 is substantially the same as that described with reference to FIGS. 3 and 4, except that a separate cross bar is not required for each pair of filter bags.

In the modification illustrated in FIGS. 5 and 6, a cluster of four filter bags is provided each of which is suspended from separate tube hooks 71 in the desired crosswise and lengthwise space, such as on 6 inch centers with 5 inch bags. Use is made of but a single cross bar 72 extending diagonally between a diagonal pair of pivots. A short bar 74, fixed to the center of the cross bar 72, is arranged to extend horizontally perpendicular thereto and the openings 76 for the boot strap rod 78 are suspended equidistantly in the cross bar 70 and the short bar 74 from the center, as well as equidistantly from the tube hooks, thereby to position the boot strap rods along the inner sides of each of the filter bags. In this arrangement, the boot strap rods can be attached to the adjacent filter bags at one or more spaced apart portions from their end support.

In response to reciprocating movement of the shaker channels, the same whipping and spinning action is imparted to the suspended filter bag.

FIGS. 7 and 8 illustrate a still further modification wtih respect to the modification shown in FIGS. 5 and 6. Instead of making use of a short bar positioned to extending perpendicularly from the center of the cross bar, with four openings spaced equidistantly from the center, but a single opening 80 is provided at the midpoint of the cross bar 82 between the shaker channels. A single boot strap rod 86 is suspended from the opening and is provided at its lower portion with four prongs 88 arranged 90° above and extending vertically in the desired space relationship from the boot strap rod for engagement with separate connection of the four filter bags 90 in the cluster. It will be apparent that instead of a single prong section at the end, the boot strap rod can be extended to provide additional prong sections for engagement of the filter bag at additional points.

Again, in response to reciprocating movement of the shaker channels, in accentuated movement for twisting action is imparted to the filter bag by the boot strap arrangement and hanger rods.

The latter concept can also be adapted to the shaker mechanism wherein use is made of a shaker tube, as illustrated in FIGS. 1 and 2, as well as to shaker channels as illustrated in FIGS. 3 to 8.

In the modification shown in FIGS. 9 and 10, the tube hooks 100 are mounted in the conventional manner, as previously described, to the shaker tube 102. Use is made of a separate saddle 104, secured by nuts and bolts onto the flanged portion 106 or ears extending laterally from opposite side of the shaker tube 102.

The saddle comprises a rectangular frame member which depends from the shaker tube, with the bottom wall 108 spaced a short distance below the shaker tube and extending crosswise thereof. An opening 110 is provided in the center of the saddle through which the threaded upper end portion 112 of a boot strap rod 116 extends for attachment by nut members 114, which enable vertical adjustment.

As in the modification described in FIGS. 7 and 8, the boot strap rod 116 is in the form of a grappling hook with a cluster of four prongs extending vertically into the desired spaced relation from the rod so as to be positioned alongside the hanging filter bags for attachment thereto. Again, in a four bag cluster, the prongs are arranged 90° apart with one or more sets of prongs being used in longitudinally spaced apart relation along the boot strap rod for attachment to the filter bags at one or more lengthwise spaced points.

The rocking action imparted by the shaker tube is transmitted to the upper ends of the suspended filter bag by the tube hooks, in the conventional manner, and an accentuated rocking action is imparted to the lower spaced portions of the filter bags by the boot strap rod connection to the bags.

It will be apparent from the foregoing that there is provided a simple means for modification of current constructions in shaker mechanisms or for new designs of shaker mechanisms whereby the filter bags are subjected to a more accentuated shaking action as well as a twisting action for more effective and efficient removal of collected dust particles and filter cake and that the means for support of the filter bags provides for flattening of the bags in a controlled direction whereby contact between bags during the cleaning operation can be avoided thereby materially to extend the useful life of the filter bags.

As used herein and in the claims, the term "boot strap" is meant to include the boot strap and hooks in their various shapes and forms.

It will be understood that changes may be made in the details of construction, arrangement and operation, without departing from the spirit of the invention, especially as defined in the following claims.

I claim:

1. In a filter apparatus in which one or more elongate filter bags are suspended from their upper end from a shaking mechanism to extend vertically downwardly into a filter housing, the improvement comprising an operative connection between the shaking mechnism and one or more portions of the bag spaced below the upper end portion whereby a shaking force is imparted to the entire filter bag, in which the shaker mechanism comprises a shaker tube mounted for reciprocal rotational movement about a horizontal axis spaced above the uppper ends of the filter bags, and in which the operative connection between the shaking mechanism and the bags comprises tube hooks each of which has a hook member at the lower end portion from which a filter bag is releasably suspended, the upper ends of the tube hooks being fixed in pairs to opposite sides of the shaker tube for rocking movement of the tube hooks responsive to rotational movement of the shaker tube, elongate boot strap rods operatively connected to the shaker tube and extending downwardly alongsde the filter bags, and means connecting the filter bags to adjacent portions of the boot strap at one or more points spaced downwardly from the hook end of the tube hooks whereby rocking movement of greater dimension, magnitude and frequency is imparted to the filter bag.

2. A filter apparatus as claimed in claim 1 in which the boot strap is connected at its upper end portion with the tube hook for rocking movement therewith.

3. A filter apparatus as claimed in claim 1 in which the boot strap is connected directly to an axially spaced portion of the shaker tube for transmitting reciprocal rotational movement of the tube to rocking movement of the boot strap.

4. A filter apparatus as claimed in claim 1 in which the filter bags are mounted in groups on equally spaced centers and suspended from tube hooks on opposite sides of the shaker tube, and in which a single boot strap extends downwardly between the filter bag, and prongs extending vertically from the boot strap alongside each filter bag of the group for operative connection therewith.

5. A filter apparatus as claimed in claim 4 in which the filter bags are arranged in groups of four equally spaced centers from opposite sides of the shaker tube and the boot strap extends downwardly from the shaker tube between the four bags, and vertical prongs spaced outwardly from the boot strap adjacent the filter bags for connection therewith.

6. A filter apparatus as claimed in claim 5 which includes a saddle connected to opposite sides of the shaker tube having a crossbar spaced from the underside of the shaker tube means for adjustably connecting the boot strap at the mid portion of the crossbar to depend therefrom into the space between the filter bags.

* * * * *

UNITED STATES PATENT OFFICE
CERTIFICATE OF CORRECTION

Patent No. 3,877,901          Dated   April 15, 1975

Inventor(s)   Clyde A. Snyder

It is certified that error appears in the above-identified patent and that said Letters Patent are hereby corrected as shown below:

In the abstract, line 4, change "for" to "of".

Column 1, lines 47-48, change "motions" to "motion"; line 48, after "motion" insert --- or up and down motion, or combinations of such motions ---.

Column 4, line 9, change "1/2 inch" to "7/8 inch";

Column 4, line 17, change "botom" to "bottom".

Signed and Sealed this twenty-ninth Day of July 1975

[SEAL]

Attest:

RUTH C. MASON
*Attesting Officer*

C. MARSHALL DANN
*Commissioner of Patents and Trademarks*